UNITED STATES PATENT OFFICE.

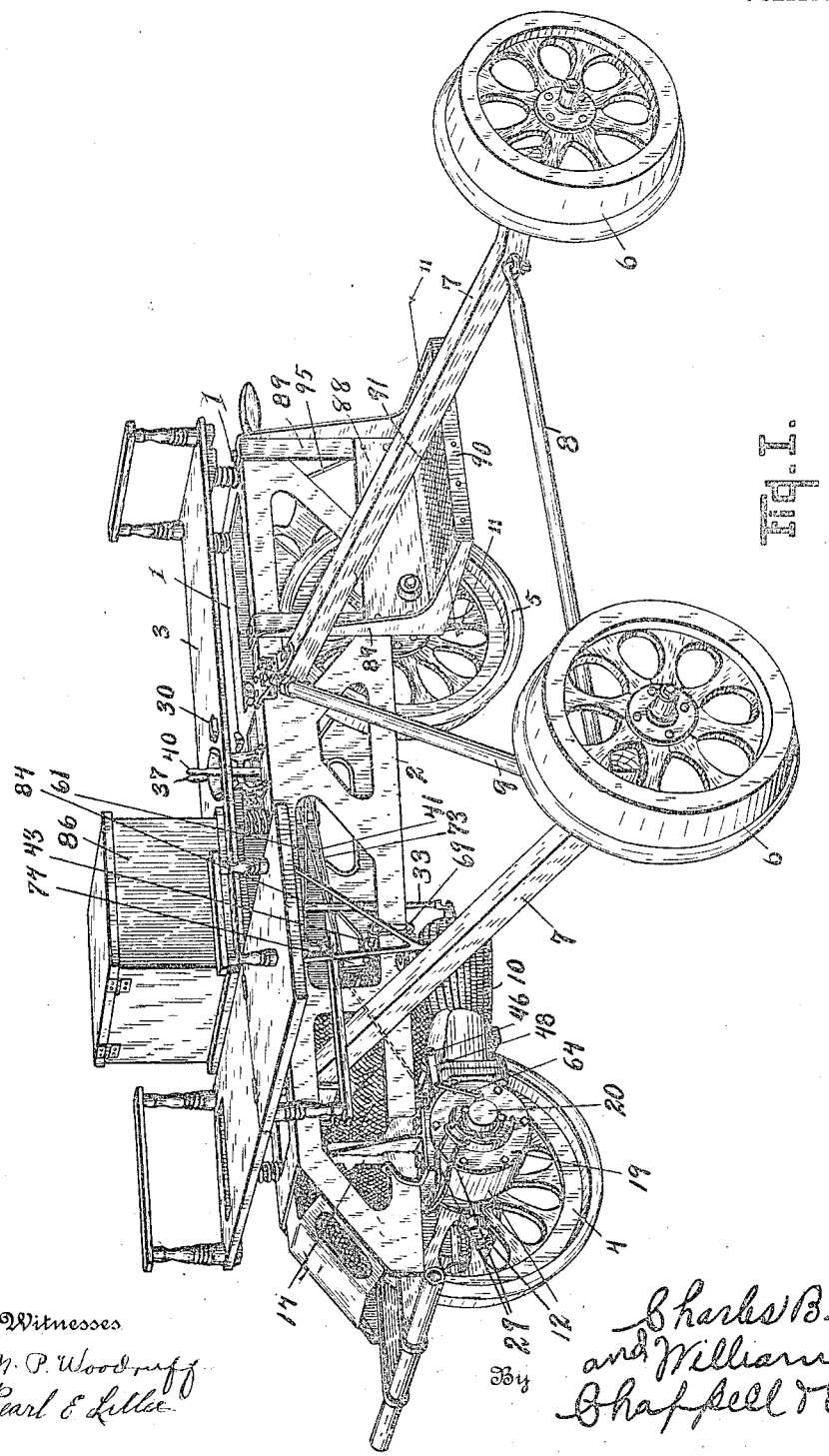

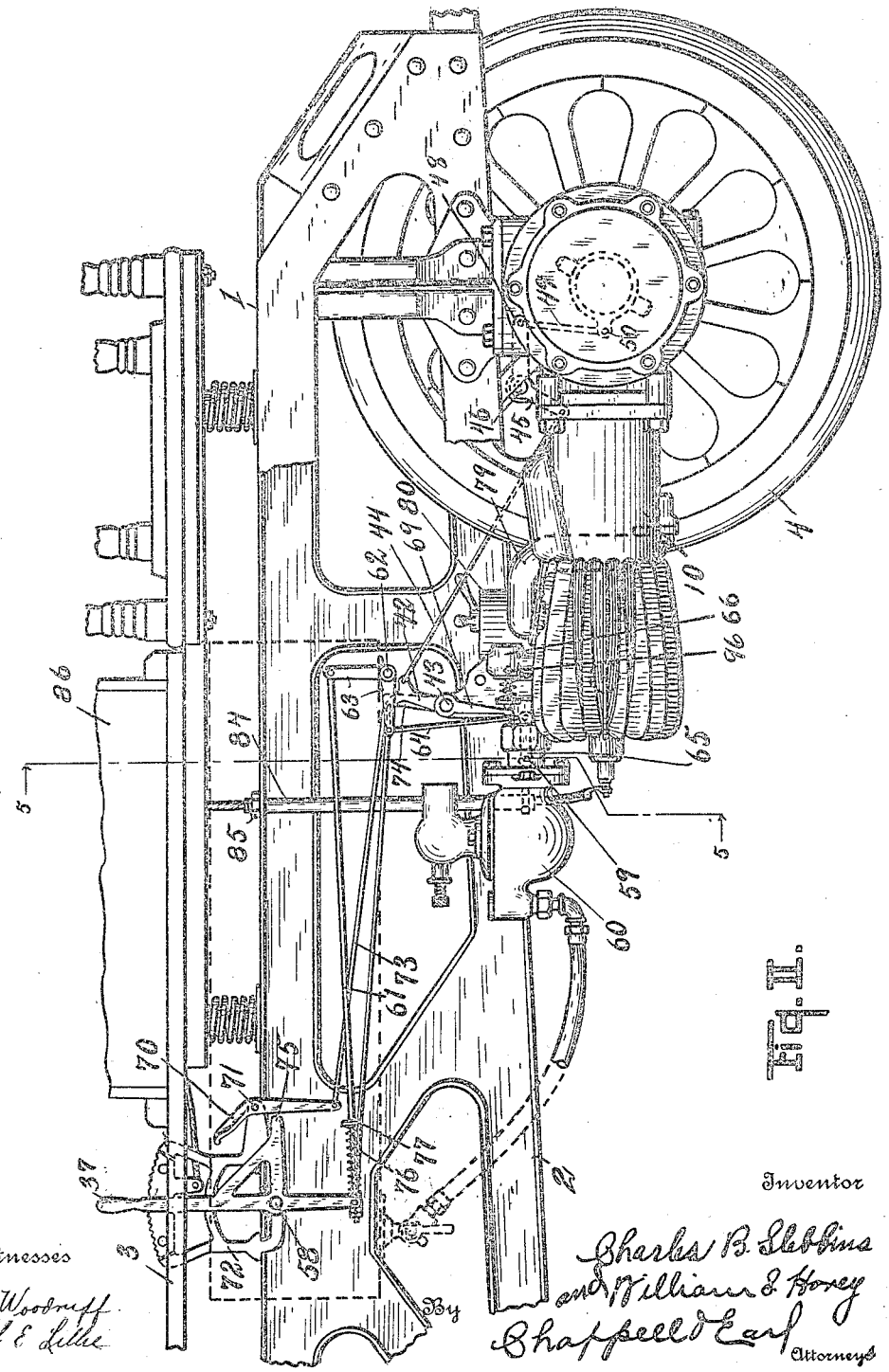

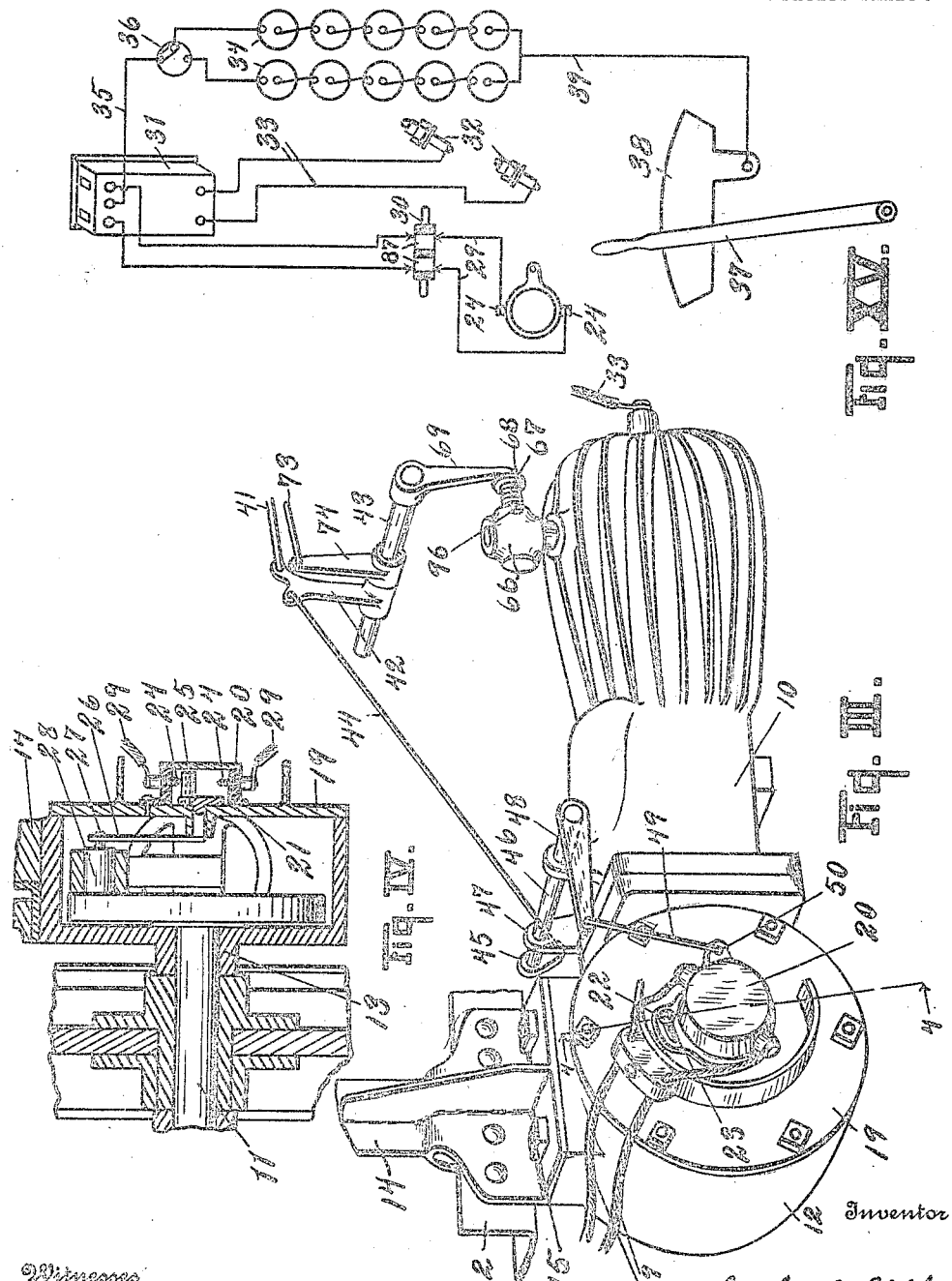

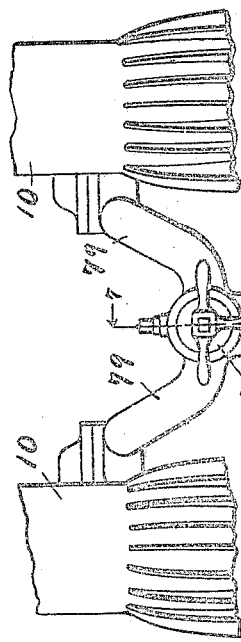
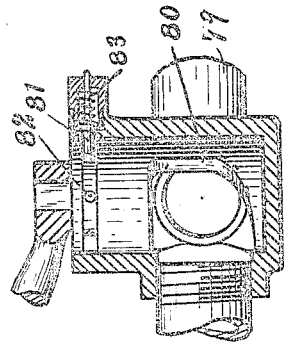
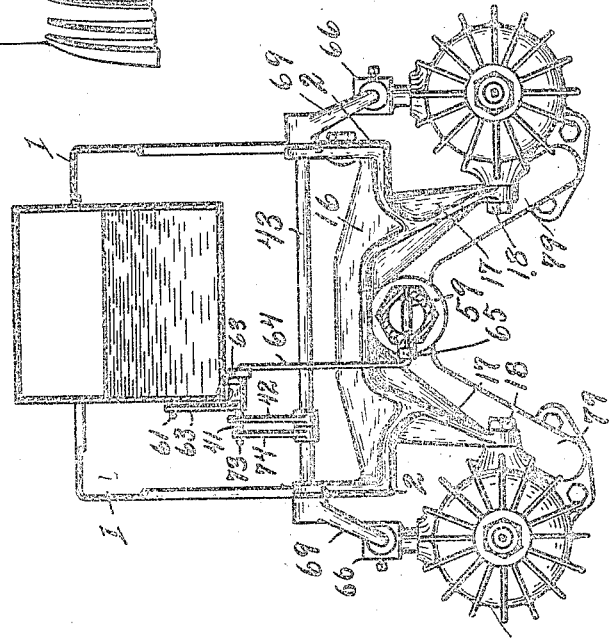

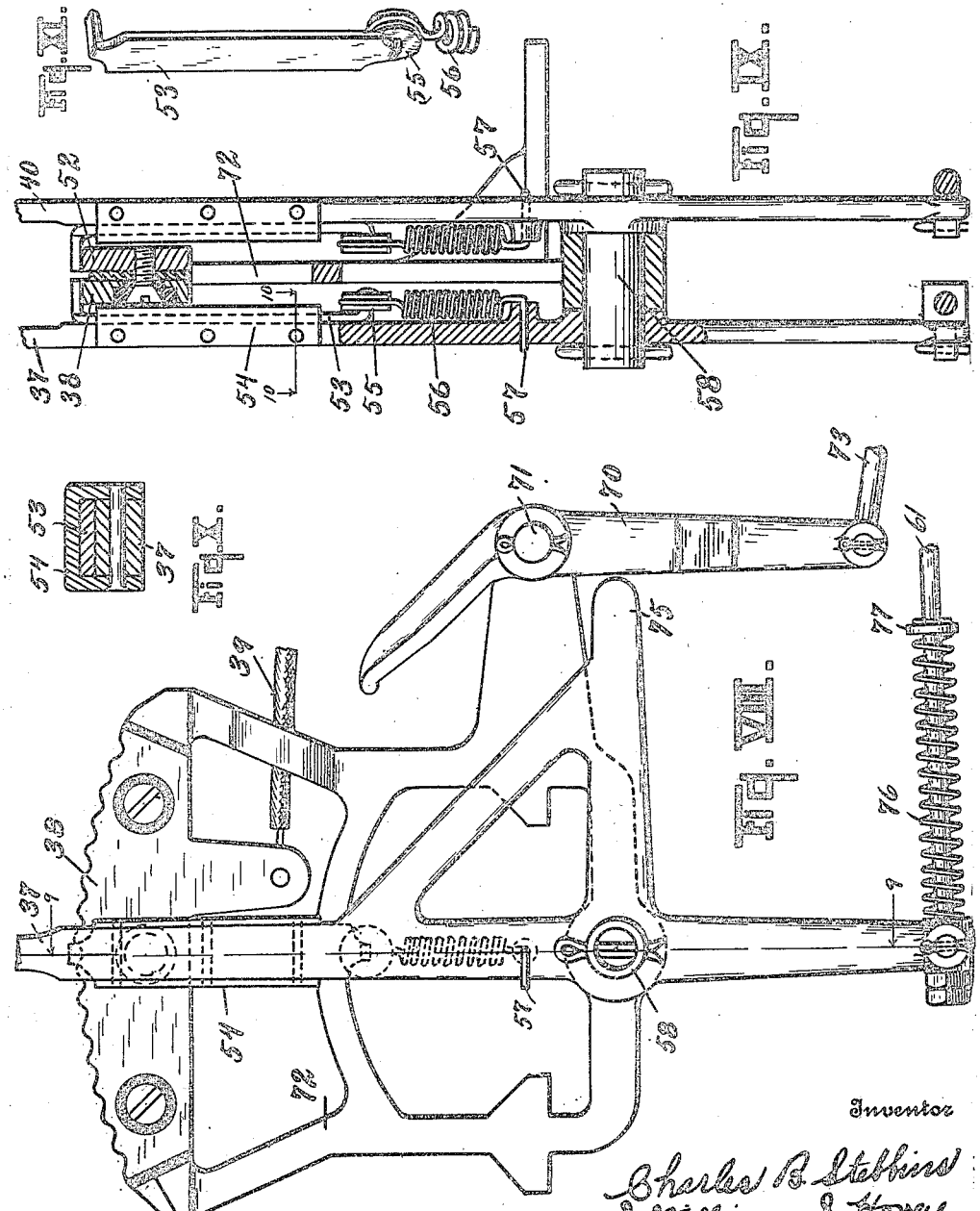

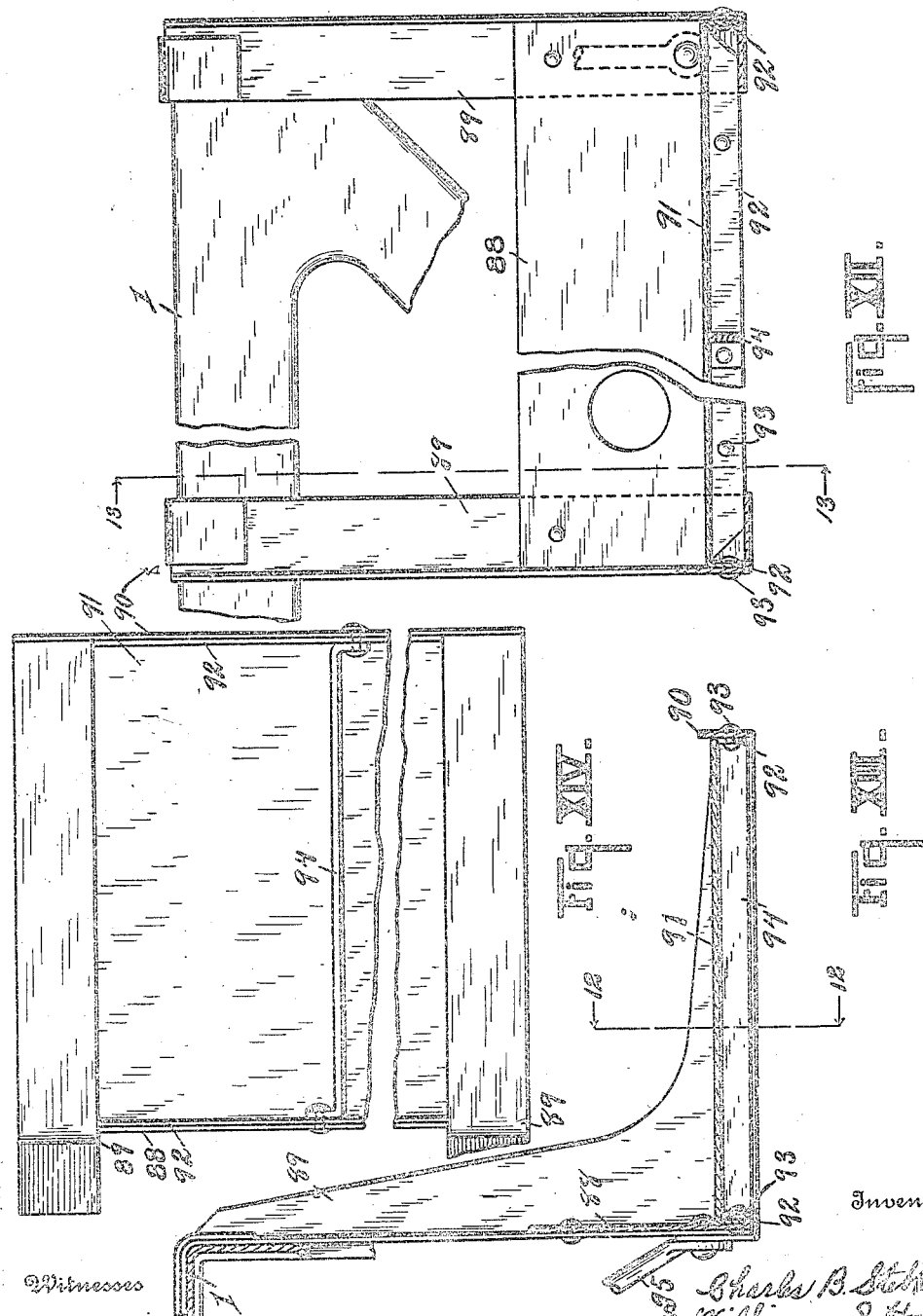

CHARLES B. STEBBINS AND WILLIAM S. HOVEY, OF THREE RIVERS, MICHIGAN, ASSIGNORS TO SHEFFIELD CAR COMPANY, OF THREE RIVERS, MICHIGAN.

MOTOR-CAR.

1,042,495.   Specification of Letters Patent.   Patented Oct. 29, 1912.

Application filed December 6, 1911. Serial No. 664,255.

*To all whom it may concern:*

Be it known that we, CHARLES B. STEBBINS and WILLIAM S. HOVEY, citizens of the United States, residing at Three Rivers, county of St. Joseph, State of Michigan, have invented certain new and useful Improvements in Motor-Cars, of which the following is a specification.

This invention relates to improvements in motor cars.

Our improvements are particularly adapted and designed by us for use on railway motor cars, and we have illustrated the same embodied in a railway motor car of the type shown in our Patent No. 987,881, dated March 28, 1911, as that is the general type of car to which we have applied them. Certain features are, however, very readily adapted for and desirable for use in other relations.

The main objects of this invention are: First, to provide in a motor car, an improved control mechanism. Second, to provide an improved motor car having a pair of engines in which either or both of the engines may be cut out of operation.

Further objects, and objects relating to structural details will definitely appear from the detailed description to follow.

We accomplish the objects of our invention by the devices and means described in the following specification.

The invention is clearly defined and pointed out in the claims.

A structure which is a preferred embodiment of our invention is clearly illustrated in the accompanying drawing, forming a part of this specification, in which:

Figure I is a perspective view of a structure embodying the features of our invention. Fig. II is a detail side elevation from the opposite side to that appearing in Fig. I, parts of the frame being broken away to better disclose the mechanism arranged within the same. Fig. III is a detail perspective view of the engine on the inner side of the car, showing the arrangement of the timer and a portion of the operating connections therefor. Fig. IV is a detail section through the crank case and timer on a line corresponding to line 4—4 of Fig. III. Fig. V is a detail transverse vertical section on a line corresponding to the broken line 5—5 of Fig. II. Fig. VI is a detail plan view of the engines and the fuel connections thereto. Fig. VII is a detail section through the control valve of the engines taken on a line corresponding to line 7—7 of Fig. VI. Fig. VIII is an enlarged detail side elevation of the control levers. Fig. IX is a detail view of the control levers partially in vertical section on a line corresponding to line 9—9 of Fig. VIII. Fig. X is a detail section on a line corresponding to line 10—10 of Fig. IX. Fig. XI is a perspective view of one of the segment catches 53. Fig. XII is a detail of the step taken on a line corresponding to line 12—12 of Fig. XIII. Fig. XIII is a detail vertical section of the step, taken on a line corresponding to line 13—13 of Fig. XII. Fig. XIV is an inverted view of the step, the bottom board or piece being omitted. Fig. XV is a diagrammatic view showing the timer and battery circuits, spark plugs and the controlling means therefor.

In the drawings, similar reference characters refer to similar parts throughout the several views, and the sectional views are taken looking in the direction of the little arrows at the ends of the section lines.

Referring to the drawing, the frame or body of the car is substantially that shown in our patent referred to, in which the longitudinal sills 1 and the bottom longitudinal sills 2 and their connecting cross pieces are formed integrally. The platform-like seat 3 is carried by suitable springs. As the details of these parts form no part of this invention, they are not further described except as may be necessary to point out the relation of the parts which are mounted thereon or associated therewith.

The structure illustrated has a pair of main wheels 4 and 5 and a pair of auxiliary wheels 6 carried by the bars 7. The bars 7 are connected at their outer ends by the tie rod 8 and are braced by the brace rod 9. The main part of the load is carried by the wheels 4 and 5 which are arranged between the side members of the frame.

The engines 10 are of the two cycle type and are arranged one at each side of the traction wheel 4, the common crank shaft 11 of the engines being adapted as the axle for the traction wheels. A crank shaft casing 12 is provided for each engine. These casings 12 have bearings 13 thereon for the crank shaft 11. The engines 10 are mounted on these crank shaft casings. The frame is also mounted upon the crank shaft casings. The casings are further connected and supported in relation to each other and the frame is braced by the yoke 14 arranged over the traction wheel. The arms of the yoke are provided with feet which are secured to the sills and to the crank shaft casings. The crank shaft casings are secured by means of bolts 15 so that the engines can be conveniently removed or dismounted as occasion requires. The engine cylinders are preferably connected by means of the bracket 16, the cross piece of which fits within the angles of the bottom sills 2 so that it constitutes a frame member as well as a supporting member for the engines. The arms 17 of this bracket project down on the inside of the engines and are secured thereto by the bolts 18 (see Fig. V). This forms a very effective mounting for the engines and their bearings are kept in proper alinement even though the frame be distorted from overload or from other cause.

The crank casing of the inner engine is provided with a side plate 19. On this side plate, we mount a timer consisting of an adjustable member 20 which is mounted on a flange-like support 21 on the side of the plate, the member being retained by the screw 22 arranged through the curved slot 23. (See Fig. III.) A pair of contacts 24 are carried by the member 21 while the coacting member 25 is rotatably mounted in the side plate 19. The member 25 has a crank 26 which is connected by the pin 27 to the crank pin 28 of the crank shaft. The contact members 24 are connected by the wires 29 and the switch 30 to the spark coil 31 (see Fig. XV). The coil is connected to the spark plugs 32 of the engines by means of the wires 33, and to the batteries 34 through the wire 35 and the switch 36. A double series of dry cell batteries are illustrated in Fig. V. The batteries are connected to the bodies of the engines through the control lever 37 which is grounded in the frame, the segment 38 of the lever being connected to the batteries by the wire 39.

The timer is adjusted through the lever 40 which is connected by the link 41 to the rocker arm 42 mounted on the rock shaft 43. The arm 42 is connected by the link 44 to an arm 45 on the rock shaft 46 mounted on the bracket-like bearings 47 on one of the engine cylinders. The rock shaft 46 is provided with an arm 48 which is connected by the link 49 to the ear 50 on the timer member 20. This connection is provided to bring the lever 40 into convenient relation to the controlling lever 37 and so that the connections are within and protected by the frame. The lever 40 is provided with a segment 52 corresponding to the segment 38 of the lever 37. The catches 52 are slidably connected to the levers by means of the straps 54. The lower ends of the catches 53 are provided with rollers 55 to which the springs 56 are connected, the lower ends of the springs being provided with securing portions 57 arranged through the lever.

The levers 37 and 40 are mounted on a common pivot 58. The segment 38 is insulated from its supporting bracket 72 and the segment 52 (see Fig. IX). The segment 38 is connected as described, to the batteries and through them to the spark coil which is in turn connected to the timer and spark plugs as described. The lever 37 being grounded to the engine, as stated, serves as a switch. When the lever is out of engagement with the insulated portion of the segment 38, the electrical connections of the ignition system of the engines are broken. The lever 37 also controls the throttle 59. The details of the throttle 59 and of the carbureter 60 are not illustrated. The lever 37 is connected to the throttle through the link 61, the rock shaft 62 having a bell crank 63 thereon and the link 64 connecting the bell crank lever 63 with the arm 65 on the throttle 59.

The engines are provided with relief valves 66 having springs 67 on their stems 68 adapted to hold them normally closed. The details of these valves are not illustrated as they will be readily understood. These valves are opened by means of arms 69 on the rock shaft 43. The rock shaft 43 is actuated from the lever 70 which is pivotally mounted at 71 on the bracket 72 on which the segments 38 and 52 and the levers 37 and 40 are mounted. The lever 70 is connected by the link 73 to an arm 74 on the rock shaft 43. The lever 37 is provided with an arm 75 adapted to engage the lever 70 when the lever 37 is shifted to close the throttle and open the circuit so that when the throttle is closed, the circuit is opened and also the relief valves are opened. When the relief valves are open the car may be pushed along the track without compression in the cylinders, and, as it is desirable to sometimes operate the car on one cylinder only, the relief valve of the other cylinder should be open so that the engine will not have to work against compression in such cylinder. To permit a further movement of the lever 37 after the throttle valve is closed, the lever is provided with a yielding connection to the link 61, which in the structure illustrated, consists of a coiled spring 76 arranged on the link, one end of the spring being engaged by the lever, the other resting against the collar 77 on the link. This arrangement is very advantageous in a structure of the class illustrated, where the crank shaft forms the axle of the traction wheel and no means of connecting or disconnecting the traction wheel from the engine are provided.

The carbureter is connected to the engine cylinders by means of the pipe 78 having branches or arms 79. The delivery pipe is controlled by the valve 80 (see Figs. VI and VII). This valve is adapted to be adjusted to deliver to both cylinders or to either. This is of advantage in cases where one of the engines becomes disabled or in the event that the two engines would furnish more power than is required to drive the car at the required speed. A spring stop pin 81 is provided for the valve 80, the stem of the valve having conical holes 82 adapted to receive the conical end of the stop pin. The pin is held yieldingly in these holes by means of the spring 83. (See Fig. VII.) This stop is merely to indicate to the person adjusting the valve when it is in the position desired, and to prevent its accidental turning.

A set screw 96 is provided for retaining the relief valves in their open positions independently of the means described.

The wires 33 are arranged through a conduit 84 extending between the top and bottom sills 2. This conduit 84 is a piece of pipe having nuts 25 threaded thereon. The batteries and spark coil are arranged in the box 86. The switch 30 which is shown in conventional form in Fig. XV is adapted to connect both of the timber contacts or either with the spark coil 31. The switch 30 is provided with contacts 87 and is adapted when in position shown in Fig. XV to connect both the wires, when shifted to the right to connect the right hand wire 29 only, and when shifted to the left to connect the left hand wire. The details of this switch are not further illustrated as various forms of switches might be used for the purpose.

The foot rest 88 is mounted on the inside of the frame and comprises a pair of L-shaped end members 89, the members being angled in cross section and being turned inwardly at their upper ends to rest upon the top sills as shown in Fig. I. At their outer ends these members are connected by cross piece 90. The foot board 91 is arranged with its ends in the angles of the end members, its edges being turned downwardly at 92 and secured by means of the rivets 93. A cross piece 94 is provided to assist in supporting the foot member. The rear end of the step is provided with a brace 95.

Our improved control mechanism is very simple and easy in its operation, which is a feature of importance in a car of this type which is operated frequently by persons not skilled in such work, and further, many of the operators are very careless and indifferent in their management and care of the car. It is, therefore, a matter of importance to provide a structure which can be operated successfully with a minimum of care and attention.

We have illustrated and described our improvements in the form in which we have embodied them in practice. We are aware, however, that considerable variation in structural details is possible, but as such variation or modification will no doubt be readily understood by those skilled in the art to which this invention relates, we have not attempted to illustrate or describe the same herein, but desire to be understood as claiming the same specifically in the form illustrated as well as broadly within the scope of the appended claims.

Having thus described our invention, what we claim as new and desire to secure by Letters Patent is:

1. The combination of an engine, a throttle therefor, a compression relief valve for said engine, an ignition means for said engine, a control lever provided with a latch, a coacting insulated segment, said control lever and segment constituting switch members for said ignition means, a rock shaft having a pair of arms thereon, an arm on said throttle, a link connecting said arm to one of the arms on said rock shaft, a link connected to the other of said rock shaft arms and slidably associated with said control lever, a spring arranged on said link to engage said lever, said link being provided with a rest for said spring, a second rock shaft having an arm thereon adapted to coact on said compression relief valve, a relief valve actuating lever, an arm on said second rock shaft, and a link connecting said arm to said relief valve actuating lever, said control lever being provided with an arm adapted to engage said relief valve actuating lever to actuate the same when said control lever is shifted to completely close the throttle and open the circuit.

2. The combination of an engine, a throttle therefor, a compression relief valve for said engine, an ignition means for said engine, a control lever constituting a switch member for said ignition means, a rock shaft having a pair of arms thereon, an arm on said throttle, a link connecting said arm to one of the arms on said rock shaft, a link connected to the other of said rock shaft arms and slidably associated with said control lever, a spring arranged on said link to engage said lever, said link being provided with a rest for said spring, a second rock shaft having an arm thereon adapted to act on said compression relief valve, a relief valve actuating lever, an arm on said second rock shaft, and a link connecting said arm to said relief valve actuating lever, said control lever being provided with an arm adapted to engage said relief valve actuating lever to actuate the same when said control lever is shifted to completely close the throttle and open the circuit.

3. The combination of an engine, a throttle therefor, a compression relief valve for said engine, a control lever, a rock shaft having a pair of arms thereon, an arm on said throttle, a link connecting said arm to one of the arms on said rock shaft, a link connected to the other of said rock shaft arms and slidably associated with said control lever, a spring arranged on said link to engage said lever, said link being provided with a rest for said spring, a second rock shaft having an arm thereon adapted to act on said compression relief valve, a relief valve actuating lever, an arm on said second rock shaft, and a link connecting said arm to said relief valve actuating lever, said control lever being provided with an arm adapted to engage said relief valve actuating lever to actuate the same when said control lever is shifted to completely close the throttle.

4. The combination of an engine, a throttle therefor, a compression relief valve for said engine, an ignition means for said engine, a control lever arranged as a circuit switch member, connections for said control lever to said throttle comprising a link slidably associated with said control lever, a spring arranged on said link to engage said lever, said link being provided with a rest for said spring, and a relief valve actuating lever, said control lever being adapted to engage said relief valve actuating lever to actuate the same when said control lever is shifted to completely close the throttle and open the circuit.

5. The combination of an engine, a throttle therefor, a compression relief valve for said engine, a control lever, connections for said control lever to said throttle comprising a link slidably associated with said control lever, a spring arranged on said link to engage said lever, said link being provided with a rest for said spring, and a relief valve actuating lever, said control lever being adapted to engage said relief valve actuating lever to actuate the same when said control lever is shifted to completely close the throttle.

6. The combination of an engine, a throttle therefor, a compression relief valve for said engine, an ignition means for said engine, a control lever adapted as a circuit switch member, connections for said control lever to said throttle, and a relief valve actuating lever, said control lever being adapted to engage said relief valve actuating lever to actuate the same when said control lever is shifted to completely close the throttle and open the circuit.

7. The combination of an engine, a throttle therefor, a compression relief valve for said engine, a control lever, connections for said control lever to said throttle, and a relief valve actuating lever, said control lever being adapted to engage said relief valve actuating lever to actuate the same when said control lever is shifted to completely close the throttle.

8. The combination of an engine, a throttle therefor, a compression relief valve for said engine, an ignition means for said engine, a throttle control lever adapted as a circuit switch member, said control lever being adapted to actuate said relief valve when said control lever is shifted to completely close the throttle and open the circuit.

9. The combination of an engine, a throttle therefor, a compression relief valve for said engine, and a throttle control lever adapted to actuate said relief valve when said control lever is shifted to completely close the throttle.

10. The combination of an engine, a compression relief valve for said engine, an ignition means for said engine, and a control lever adapted as a circuit switch member, said control lever being adapted to actuate said relief valve when said control lever is shifted to open the circuit.

11. The combination of a pair of engines, a common crank shaft for said engines, compression relief valves for said engines, a fuel supply connection for said engines comprising a valve adapted to be adjusted to deliver to either or both of them, an ignition system for said engines comprising connections adapted to be adjusted to connect both or either of them, a throttle, a throttle control lever adapted as a circuit switch member, said control lever being adapted to actuate said relief valve opening means when the control lever is shifted to completely close the throttle and open the circuit, and means for retaining the relief valves in their open position independently of the means actuated by said control lever.

12. The combination of a pair of engines, a common crank shaft for said engines, compression relief valves for said engines, a fuel supply connection for said engines comprising a valve adapted to be adjusted to deliver to either or both of them, an ignition system for said engines comprising connections adapted to be adjusted to connect both or either of them, a throttle, and a throttle lever adapted as a circuit switch member, said control lever being adapted to actuate said relief valve opening means when the control lever is shifted to completely close the throttle and open the circuit.

13. The combination of a pair of engines, a crank shaft for said engines, compression relief valves for said engines, fuel supply connections for said engines adapted to deliver to either or both of them, an ignition system for said engines comprising connections adapted to be adjusted to connect both or either of them, and means for retaining either of said relief valves in their open positions.

14. The combination of a pair of engines, a crank shaft for said engines, compression relief valves for said engines, fuel supply connections for said engines, an ignition system for said engines comprising connections adapted to be adjusted to connect both or either of them, and means for retaining said relief valves in their open positions.

15. The combination of a plurality of engines, fuel supply connections for said engines adapted to be adjusted to deliver fuel to all or any of them, an ignition means for said engines adapted to be adjusted to deliver the current to all or any of said engines, a throttle, a throttle control adapted as a circuit switch member, relief valves for said cylinders, a relief valve actuating means adapted to be actuated by said throttle control when the same is adjusted to completely close the throttle and open the circuit, and means for retaining relief valves in their open position independent of said means actuated by said control lever.

16. The combination of a plurality of engines, fuel supply connections for said engines adapted to be adjusted to deliver fuel to all or any of them, an ignition means for said engines adapted to be adjusted to deliver the current to all or any of said engines, relief valves for said cylinders, and means for retaining relief valves in their open position.

17. The combination of an engine, a compression relief valve for said engine, a rock shaft having an arm thereon adapted to engage said relief valve, an ignition means for said engine comprising a circuit controlling switch, and connections for said rock shaft to said switch whereby said relief valve is opened when the switch is opened.

18. The combination of an engine, a compression relief valve for said engine, an ignition means for said engine comprising a circuit controlling switch, and connections for said relief valve and said switch whereby the relief valve and switch are opened together.

19. The combination of a plurality of engines, compression relief valves for said engines, a rock shaft having arms thereon adjusted to engage said relief valves, an ignition means for said engines comprising a circuit controlling switch, and connections for said rock shaft to said switch whereby said relief valves are opened when said switch is opened.

20. The combination of a plurality of engines, compression relief valves for said engines, an ignition means for said engines comprising a circuit controlling switch, and connections for said relief valves to said switch whereby said relief valves and switch are opened together.

In witness whereof, we have hereunto set our hands in the presence of two witnesses.

CHARLES B. STEBBINS.
WILLIAM S. HOVEY.

Witnesses to the signature of Charles B. Stebbins:
ARTHUR P. COTTLE,
ORLEY R. BAIRD.

Witnesses to the signature of William S. Hovey:
JULIA MOTT,
CARRIE M. CRAIG.